US006650988B2

(12) United States Patent
Kawasaki et al.

(10) Patent No.: US 6,650,988 B2
(45) Date of Patent: Nov. 18, 2003

(54) METHOD AND APPARATUS FOR JUDGING ROAD SURFACE CONDITIONS, AND PROGRAM FOR SETTING THRESHOLD FOR JUDGING ROAD SURFACE CONDITIONS (75) Inventors: Hiroaki Kawasaki, Kobe (JP); Yukio Nakao, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/270,558

(22) Filed: Oct. 16, 2002

(65) Prior Publication Data
US 2003/0078717 A1 Apr. 24, 2003

(30) Foreign Application Priority Data

Oct. 16, 2001 (JP) ........................................ 2001-318195

(51) Int. Cl.[7] ................................................. B60T 8/66
(52) U.S. Cl. ............................... 701/80; 701/71; 701/90
(58) Field of Search ............................... 701/80, 71, 90, 701/73, 74; 73/9, 118.2; 303/148, 149, 150

(56) References Cited

U.S. PATENT DOCUMENTS 6,276,189 B1 * 8/2001 Hurson ........................... 73/9
6,427,519 B2 * 8/2002 Ueda et al. ..................... 73/9

FOREIGN PATENT DOCUMENTS

| JP | 04-224447 | 8/1992 |
| JP | 07-112659 | 5/1995 |
| JP | 2852517 | 11/1998 |
| JP | 3059826 | 4/2000 |
| JP | 2001-253334 | 9/2001 |

* cited by examiner

Primary Examiner—Marthe Y. Marc-Coleman
(74) Attorney, Agent, or Firm—Birch, Stewart, Kolasch & Birch, LLP (57) ABSTRACT A method and an apparatus for judging road surface conditions are disclosed. The method includes the steps of: detecting rotational information of tires; storing the rotational information of the respective tires; calculating a vehicle velocity; calculating an acceleration/deceleration of the vehicle; calculating a slip ratio of left-sided front and rear wheels and right-sided front and rear wheels and a slip ratio of front and rear wheels, respectively; calculating an amount of fluctuation in differences in slip ratios between the right and left wheels; obtaining a linear regression coefficient and a correlation coefficient between the slip ratio of the front and rear wheels and the acceleration/deceleration of the vehicle; and setting a threshold for judging road surface conditions. The method and apparatus allow for road surface conditions to be judged accurately.

10 Claims, 5 Drawing Sheets

METHOD AND APPARATUS FOR JUDGING ROAD SURFACE CONDITIONS, AND PROGRAM FOR SETTING THRESHOLD FOR JUDGING ROAD SURFACE CONDITIONS

BACKGROUND OF THE INVENTION

The present invention relates to a method and apparatus for judging road surface conditions and to a program for setting a threshold for judging road surface conditions. More particularly, it relates to a method and apparatus for judging road surface conditions and to a program for setting a threshold for judging road surface conditions with which it is possible to identify a tire that is presently mounted when a tire has been exchanged or other occasions and to set a threshold for determining a tendency of slip.

An apparatus for estimating coefficients of road surface friction $\mu$ (road surface $\mu$) is known, for instance, from Japanese Unexamined Patent Publication No. 112659/1995. The road surface $\mu$ here is for indicating degrees of frictional bond between road surfaces and tires, wherein the larger this road surface $\mu$ is, the larger the acceleration generated by the vehicle will be and wherein the road surface $\mu$ is further characterized in that it increases in accordance with a rise in slip rate of the wheel in the range of approximately 10 to 20%. Based on the fact that the larger the slip rate of the vehicle is, the smaller the friction coefficient with the road surface will be even when the same vehicle acceleration is generated, the publication is considering a characteristic curve of vehicle acceleration-slip rate of the wheels S upon replacing the road surface $\mu$ with vehicle acceleration in the characteristic curve between the road surface $\mu$ and the slip rate of the wheels.

In the apparatus disclosed in the publication, the road surface $\mu$ is estimated on the basis of a relationship between a sum total of slip rates of respective wheels that have been summed up over a plurality of periods and the vehicle acceleration that has been summed up over a plurality of periods to thereby reduce influences of error factors such as noise. More particularly, the relationship between the slip rate and the vehicle acceleration is given as a ratio (gradient) M of vehicle acceleration $\Sigma Ab$ integrated by a specified period of time to a sum of slip rates of the wheels $\Sigma St$ integrated by a specified period of time (M=$\Sigma Ab/\Sigma St$), and road surface conditions are estimated on the basis of the value of M.

However, since the method of the Japanese Unexamined Patent Publication No. 112659/1995 requires it to preliminarily obtain the ratios M representing the relationship between the vehicle acceleration and the slip rate while utilizing values for coefficients of surface friction, which were obtained when the vehicle was made to run on a road surface of apparently high road surface $\mu$, as references, setting needs to be performed for each of the tires. The values of M are also changed accompanying wear in tires or hardening of aging rubber.

It is therefore being wanted for a method with which it is possible to automatically set a threshold in accordance with presently mounted tires for judging road surface conditions.

SUMMARY OF THE INVENTION

The present invention has been made in view of the above facts, and it is an object thereof to provide a method and apparatus for judging road surface conditions that is capable of accurately setting a threshold for determining a tendency to slip upon identifying presently mounted tires, and a program for setting a threshold for judging road surface conditions.

According to a first aspect of the present invention, there is provided a method for judging road surface conditions, the method including the steps of: periodically detecting rotational information of tires of four wheels of a vehicle; storing the rotational information of the respective tires; calculating a vehicle velocity from the rotational information; calculating an acceleration/deceleration of the vehicle; calculating a slip ratio of left-sided front and rear wheels and right-sided front and rear wheels and a slip ratio of front and rear wheels, respectively; calculating an amount of fluctuation in differences in slip ratios between the right and left wheels; obtaining a linear regression coefficient and a correlation coefficient between the slip ratio of the front and rear wheels and the acceleration/deceleration of the vehicle; and setting a threshold for judging road surface conditions on the basis of the linear regression coefficient if the amount of fluctuation is a specified value.

According to a second aspect of the present invention, there is provided an apparatus for judging road surface conditions including a rotational information detecting means for periodically detecting rotational information of tires of four wheels of a vehicle; a rotational information storing means for storing the rotational information of the respective tires; a vehicle velocity calculating means for calculating a vehicle velocity from the rotational information; an acceleration/deceleration calculating means for calculating an acceleration/deceleration of the vehicle; a slip ratio calculating means for calculating a slip ratio of left-sided front and rear wheels and right-sided front and rear wheels and a slip ratio of front and rear wheels, respectively; a fluctuation amount calculating means for calculating an amount of fluctuation in differences between the right and left slip ratios; a coefficient calculating means for obtaining a linear regression coefficient and a correlation coefficient between the slip ratio of the front and rear wheels and the acceleration/deceleration of the vehicle; and a threshold setting means for setting a threshold for judging road surface conditions on the basis of the linear regression coefficient if the amount of fluctuation is a specified value.

According to a third aspect of the present invention, there is provided a program for setting a threshold for judging road surface conditions, wherein a computer is made to function as a rotational information storing means for storing rotational information of respective tires; a vehicle velocity calculating means for calculating a vehicle velocity from the rotational information; an acceleration/deceleration calculating means for calculating an acceleration/deceleration of the vehicle; a slip ratio calculating means for calculating a slip ratio of left-sided front and rear wheels and right-sided front and rear wheels and a slip ratio of front and rear wheels, respectively; a fluctuation amount calculating means for calculating an amount of fluctuation in differences between right and left slip rates; a coefficient calculating means for obtaining a linear regression coefficient and a correlation coefficient between the slip ratio of the front and rear wheels and the acceleration/deceleration of the vehicle; and a threshold setting means for setting a threshold for judging road surface conditions on the basis of the linear regression coefficient if the amount of fluctuation is a specified value.

DETAILED DESCRIPTION

The method and apparatus for judging road surface conditions and the program for setting a threshold for judging road surface conditions according to the present invention will now be explained with reference to the accompanying drawings.

Figure 1:
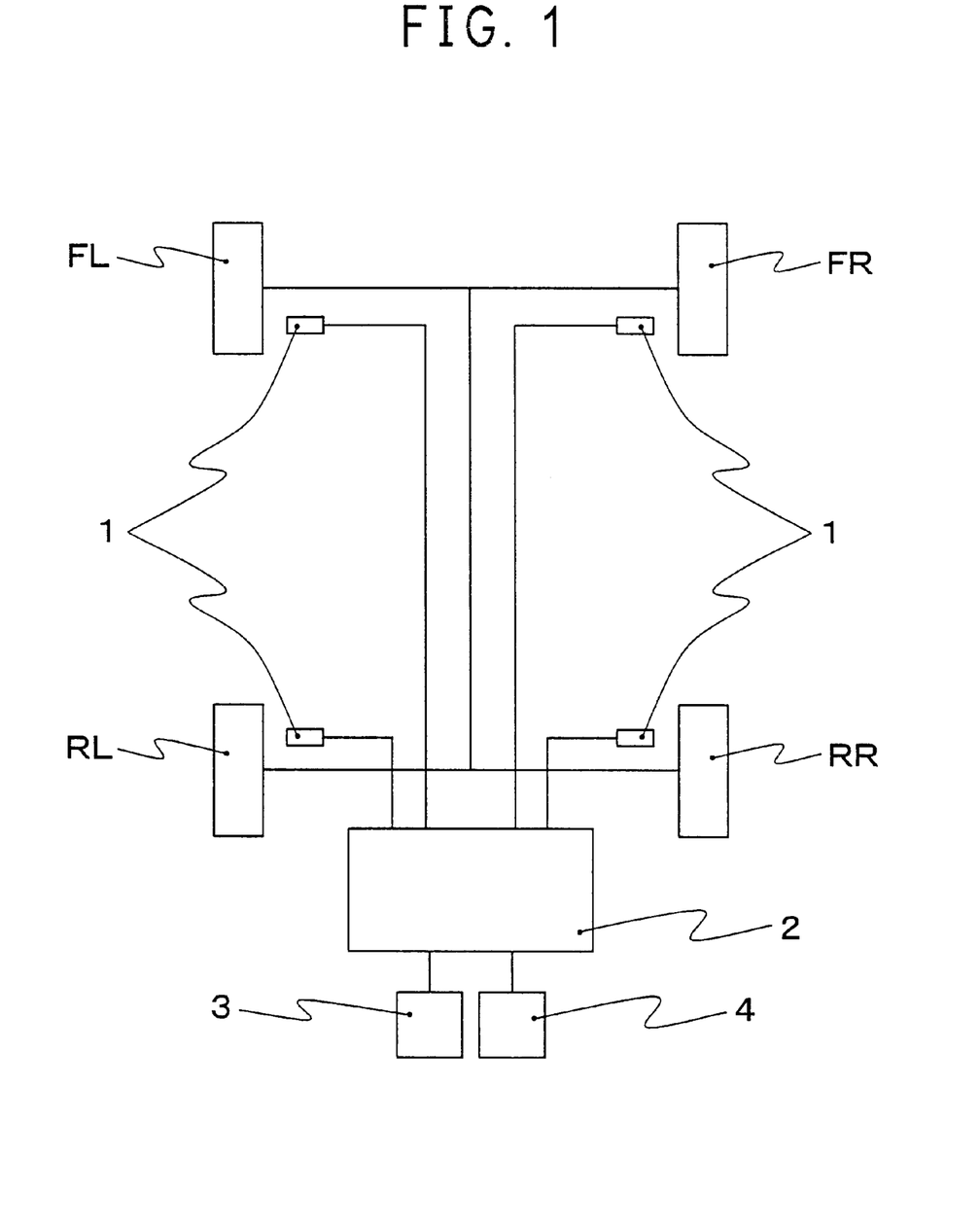
FIG. 1 is a block diagram for illustrating an embodiment of the apparatus for judging road surface conditions according to the present invention.

As illustrated in FIG. 1, the apparatus for judging road surface conditions according to an embodiment of the present invention is provided with ordinary rotational information detecting means 1 respectively provided in a four-wheeled vehicle relative to four tires FL, FR, RL and RR. The rotational information detecting means 1 might be a wheel speed sensor for measuring a wheel speed (rotational velocity) on the basis of number of pulses upon generating rotational pulses by using an electromagnetic pickup or similar. Outputs of the rotational information detecting means 1 are supplied to a control unit 2, which might be a computer such as an ABS. A low $\mu$ road alarming display 3 for informing a road surface of low $\mu$ composed of liquid crystal display elements, plasma display elements or CRT and an initializing switch 4 that might be operated by a driver are connected to the control unit 2.

Figure 2:
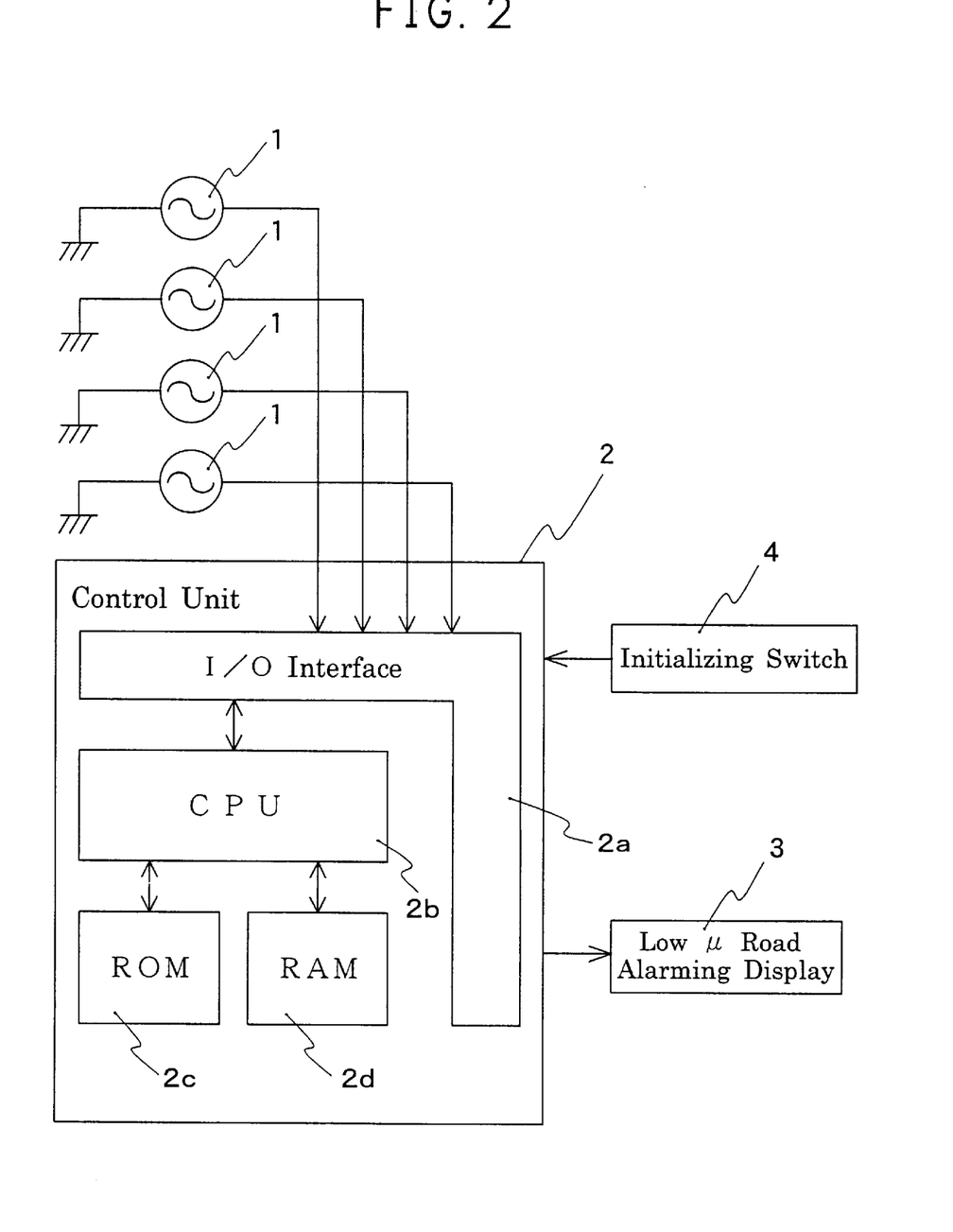
FIG. 2 is a block diagram for illustrating electric arrangements of the apparatus for judging road surface conditions of FIG. 1.

The control unit 2 comprises, as illustrated in FIG. 2, an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

Here, road surface conditions are continuously observed, and if it is determined that the road is of high $\mu$, a reference value (a linear regression coefficient) KA1 is obtained on the basis of the data obtained while running on the road of high $\mu$, and a threshold LA can be set from the reference value KA1.

Processes for determining a road of high $\mu$ employ variations in friction coefficients $\mu$. More particularly, it is made use of the fact that a friction coefficient $\mu$ of a road of low $\mu$ such as a trod, frozen snow road is not stable while a friction coefficient $\mu$ of a road of high $\mu$ such as an asphalt road is comparatively stable, and it can be determined whether the road is of high $\mu$ or not on the basis of the relationship between the slip ratio between front and rear wheels (ratio of wheel speed of the front wheel tires to a wheel speed of the rear wheel tires) and the acceleration/deceleration of the vehicle when the vehicle is made to run over a specified distance.

However, actual running on various roads of low $\mu$ revealed that there might also be a road of low but stable friction coefficient $\mu$, for instance, a fine trod snow road. More particularly, even when running on a trod snow road, variations in the slip ratios of the front and rear wheels and acceleration/deceleration of the vehicle might be small so that the correlation coefficient RA becomes not less than a specified value, for instance, not less than 0.9. Since the reference value KA1 obtained at that time will be a value that is larger than the reference value KA1 obtained when running on an asphalt road, the threshold LA will gradually become larger if the vehicle continues running on such a road for a long period of time, even though the threshold LA is obtained upon averaging with prior reference value, so that it might happen that no alarm can be smoothly generated.

It is therefore required to determine a road of high $\mu$ not only on the basis of variations in slip ratios of front and rear wheels and acceleration/deceleration of the vehicle but also by using different indices. It has thus been paid attention to differences in right and left slip ratios. While no large differences are found in road surface conditions on the left side and the right side of the vehicle when the road is of high $\mu$ such as an asphalt road, there are high possibilities that road conditions on the right and left differ from each other in the case of low $\mu$ roads such as a trod snow road or a frozen snow road. Differences in slip ratios between the left-sided front and rear wheels and the right-sided front and rear wheels might accordingly become larger, and an amount of fluctuation in differences between slip ratios will become larger in accordance therewith.

It has thus been devised in the present embodiment to set a threshold, if a reference value has been obtained with the correlation coefficient being not less than the specified value on the basis of the relationship between the slip ratios of the front and rear wheels and the acceleration/deceleration of the vehicle, upon correcting the obtained reference value in accordance with the amount of fluctuation in differences between slip ratios of left-sided front and rear wheels and right-sided front and rear wheels (right and left slip ratios) obtained per each sampling time.

If the amount of fluctuation is larger than a specified value, it is determined that the road surface condition is not stable (that is, it is not a high $\mu$ road) such that data for the reference value are rejected even if the correlation coefficient is not less than the specified value, and the threshold is not updated.

The present embodiment comprises a rotational information detecting means for periodically detecting rotational information of tires of four wheels of a vehicle; a rotational information storing means for storing the rotational information of the respective tires; a vehicle velocity calculating means for calculating a vehicle velocity from the rotational information; an acceleration/deceleration calculating means for calculating an acceleration/deceleration of the vehicle; a slip ratio calculating means for calculating a slip ratio of left-sided front and rear wheels and right-sided front and rear wheels and a slip ratio of front and rear wheels, respectively; a fluctuation amount calculating means for calculating an amount of fluctuation of differences in right and left slip ratios; a coefficient calculating means for obtaining a linear regression coefficient and a correlation coefficient between the slip ratio of the front and rear wheels and the acceleration/deceleration of the vehicle; and a threshold setting means for setting a threshold for judging road surface conditions on the basis of the linear regression coefficient if the amount of fluctuation is a specified value.

It further comprises a traveling distance calculating means for calculating a traveling distance of the vehicle; a fluctuation amount averaging and processing means for performing averaging of the amount of fluctuation per each specified traveling distance of the vehicle; a coefficient correcting means for correcting the linear regression coefficient if an averaged fluctuation amount is a specified value; and a reject means for rejecting the linear regression coefficient if the averaged fluctuation amount is not less than a specified value and for refraining from updating the threshold.

The program for setting a threshold for judging road surface conditions according to the present embodiment is so arranged that the control unit 2 is made to function, as the rotational information storing means for storing the rotational information of the respective tires from values measured by the rotational information detecting means 1; the vehicle velocity calculating means for calculating a vehicle velocity from the rotational information; the acceleration/deceleration calculating means for calculating an acceleration/deceleration of the vehicle; the slip ratio calculating means for calculating a slip ratio of left-sided front and rear wheels and right-sided front and rear wheels and a slip ratio of front and rear wheels, respectively; the fluctuation amount calculating means for calculating an amount of fluctuation in differences between the right and left slip ratios; the coefficient calculating means for obtaining a linear regression coefficient and a correlation coefficient between the slip ratio of the front and rear wheels and the acceleration/deceleration of the vehicle; and the threshold setting means for setting a threshold for judging road surface conditions on the basis of the linear regression coefficient if the amount of fluctuation is a specified value.

The rotational velocities of the tires of the four wheels are detected at intervals of not more than 0.1 second, and preferably not more than 0.05 second. The vehicle velocity and the traveling distance are calculated on the basis of rotational velocities of the four wheels and a dynamic load radius of the tires. While the acceleration/deceleration of the vehicle can be measured by using a G sensor, it is preferable to calculate the same upon differentiating the vehicle speed in view of costs.

Then, the slip ratio and the acceleration/deceleration of the vehicle are obtained upon moving averaging as average values of data of a specified period of time, for instance, data of at least 0.1 second obtained per each sampling time.

Steps (1) to (13) for illustrating actions of the apparatus for judging road surface conditions according to one embodiment of the present invention will now be explained with reference to FIG. 3.

(1) The wheel speeds ($V1_n$, $V2_n$, $V3_n$, $V4_n$) are calculated from the respective rotational velocities of the four wheel tires of the vehicle FL, FR, RL and RR (Step S1).

Wheel speed data obtained at an arbitrary point of time of the respective wheel tires FL, FR, RL and RR from a sensor such as an ABS sensor are defined to be wheel speeds $V1_n$, $V2_n$, $V3_n$, $V4_n$.

(2) Average wheel speeds of following wheels and driving wheels ($Vf_n$, $Vd_n$) are calculated.

If the vehicle is a front wheel drive vehicle, average wheel speeds of the following wheels and the driving wheels $Vf_n$, $Vd_n$ at an arbitrary point of time are obtained from the following equations (1), (2) for calculating the vehicle velocity (Step S2).

$$Vf_n=(V3_n+V4_n)/2 \tag{1}$$

$$Vd_n=(V1_n+V2_n)/2 \tag{2}$$

(3) The traveling distance of the vehicle per unit time is then calculated from equation (3) below (Step S2).

$$DIST=Vf_n\times\Delta t \tag{3}$$

Here, $\Delta t$ is a time interval (sampling time) between average wheel speed $Vf_n$ and $Vf_{n-1}$ of the following wheels calculated on the basis of the wheel speed data.

(4) The difference SSR between slip ratios of the left-sided front and rear wheels and right-sided front and rear wheels is then calculated from the following equation (4) (Step S3).

$$SSR=|V_1/V_3-V_2/V_4| \tag{4}$$

(5) Thereafter, an amount of fluctuation SVAL in the difference SSR of the slip ratios is calculated from equation (5) below, and an average fluctuation amount SVALM for this amount of fluctuation SVAL is calculated for every specified traveling distance, for instance, every 1,000 m (Steps S4 to S8).

$$SVAL_n=|SSR_n-SSR_{n-1}| \tag{5}$$

(6) The acceleration/deceleration of the vehicle (that is, an average acceleration/deceleration speed of the following wheels) $Af_n$ is calculated continuing to the above Step S2 (Step S9).

Supposing that a wheel speed data preceding the average wheel speed $Vf_n$ of the following wheels by one is an average wheel speed $Vf_{n-1}$, the acceleration/deceleration of the vehicle $Af_n$ is given by the following equation (6).

$$Af_n=(Vf_n-Vf_{n-1})/\Delta t/g \tag{6}$$

Here, $\Delta t$ is a time interval (sampling time) between wheel speed $Vf_n$ and $Vf_{n-1}$ of the wheels calculated on the basis of the wheel speed data, and g is acceleration of gravity. In order to reduce variations in data and enabling judgment in a short time, the sampling time is required to be not more than 0.1 second. More preferably, the value should be not more than 0.05 second.

(7) The slip ratio of the front and rear wheels is calculated in accordance with the value of the acceleration/deceleration $Af_n$ of the vehicle (Step S9).

The slip ratio $S_n$ is calculated from the following equations (7) and (8) provided that no conditions come true in which the vehicle is making a slip under an accelerated condition with the driving wheels being in a locked condition ($Vd_n=0$, $Vf_n\neq 0$), or in which the driving wheels are wheel-spinning under a decelerated condition with the vehicle being in a halted condition ($Vf_n=0$, $Vd_n\neq 0$)

If $Af_n\geq 0$ and $Vd_n\neq 0$, $$S_n=(Vf_n-Vd_n)/Vd_n \tag{7}$$

If $Af_n<0$ and $Vf_n\neq 0$, $$S_n=(Vf_n-Vd_n)/Vf_n \tag{8}$$

If none of the above are satisfied, $S_n=1$ will come true.

(8) Data of the slip ratio of the front and rear wheels and acceleration/deceleration of the vehicle are processed to undergo moving averaging for every sampling time (Step S10).

As for the slip ratio, $$MS_n=(S_1+S_2+\ldots+S_n)/N \tag{9}$$

$$MS_{n+1}=(S_2+S_3+\ldots+S_{n+1})/N \tag{10}$$

$$MS_{n+2}=(S_3+S_4+\ldots+S_{n+2})/N \tag{11}$$

As for the acceleration/deceleration of the vehicle, $$MAf_n=(Af_1+Af_2+\ldots+Af_n)/N \tag{12}$$

$$MAf_{n+1}=(Af_2+Af_3+\ldots+Af_{n+1})/N \tag{13}$$

$$MAf_{n+2}=(Af_3+Af_4+\ldots+Af_{n+2})/N \tag{14}$$

The moving averaged slip ratios and acceleration/deceleration of the vehicle are accumulated until the traveling distance has reached a specified distance. In estimating road surface conditions, road surface conditions will ceaselessly change with time so that it is necessary to perform the estimation within a short time, for instance, within several seconds, wherein setting of the threshold for judging road surface conditions need not be performed so quickly. Data corresponding to a specified comparatively long distance are accordingly accumulated for obtaining a linear regression coefficient and a correlation coefficient.

(9) In case the traveling distance is a specified distance, linear regression coefficients, that is, a regression coefficient KA1 corresponding to a ratio of the slip ratio of the front and rear wheels to the acceleration/deceleration of the vehicle and a regression coefficient KA2 corresponding to a ratio of the acceleration/deceleration of the vehicle to the slip ratio of the front and rear wheels, as well as a correlation coefficient RA are calculated (Step S11).

$$KA1 = \frac{\sum (MAf_i \times MS_i) - N \times \overline{MAf} \times \overline{MS}}{\sum MAf_i^2 - N \times \overline{MAf} \times \overline{MAf}} \quad (13)$$

$$KA2 = \frac{\sum (MAf_i \times MS_i) - N \times \overline{MAf} \times \overline{MS}}{\sum MS_i^2 - N \times \overline{MS} \times \overline{MS}} \quad (14)$$

Here, $\overline{MS}$ and $\overline{MAf}$ represent average values of N-number of slip ratios and acceleration/deceleration of the vehicle which are respectively moving averaged. It can be found from Table 1 that the regression coefficient KA1 is 0.12 while the regression coefficient KA2 is 7.27.

TABLE 1

| N | MAf | MS | MAf × MS | Maf$^2$ | MS$^2$ |
|---|-----|-----|----------|---------|--------|
| 1 | 0.0270 | 0.0075 | 0.000203 | 0.000729 | 0.00005625 |
| 2 | 0.0260 | 0.0073 | 0.00019 | 0.000676 | 0.00005329 |
| 3 | 0.0250 | 0.0073 | 0.000183 | 0.000625 | 0.00005329 |
| 4 | 0.0240 | 0.0071 | 0.00017 | 0.000576 | 0.00005041 |
| 5 | 0.0260 | 0.0074 | 0.000192 | 0.000676 | 0.00005476 |
| Total | 0.128 | 0.0366 | 0.0009376 | 0.003282 | 0.000268 |
| Average | 0.0256 | 0.00732 | — | | |

The correlation coefficient RA is obtained as $$RA=KA1 \times KA2 \quad (17)$$

(10) The value of the linear regression coefficient KA1 is then corrected in accordance with the average fluctuation amount SVALM whereupon setting of a threshold is performed by using this linear regression coefficient KA1. The linear regression coefficient KA1 to be corrected has been calculated on the basis of the acceleration/deceleration of the vehicle and the slip ratio per every specified distance wherein the correlation coefficient RA exceeds a specified value of, for instance, 0.9 (Step S12).

Here, if the average fluctuation amount SVALM is not less than a specified value even though the correlation coefficient RA is larger than the specified value, the road surface conditions will not be stable so that the obtained linear regression coefficient KA1 is rejected (Step S13).

Figure 4:
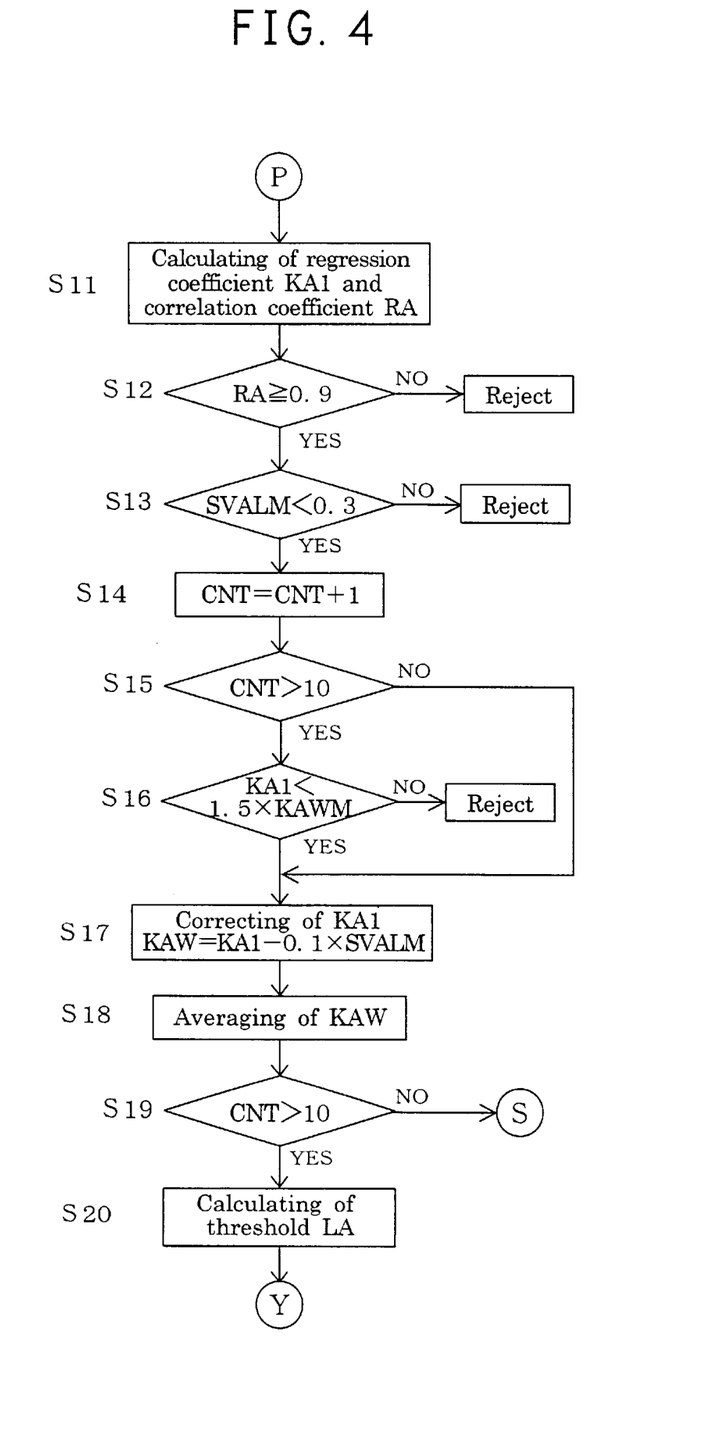
FIG. 4 illustrates one example of a flowchart of the present invention.

(11) One exemplar method for obtaining a corrected regression coefficient KAW of the linear regression coefficient KA1 will now be explained. It is determined that the larger the average fluctuation amount SVALM of a road surface is, the lower the $\mu$ of the road will be, and correction is performed on the premise that the obtained linear regression coefficient KA1 is larger than a value for a high $\mu$ road.

Note that the above-described steps will be processed until the steps are repeated for, say, 10 times with the count starting at zero (Steps S14, S15), and the program proceeds from Step S15 to S17 onto S18 and S19 without proceeding to Step S16. By repeating this flow of steps starting from Step S1, an average reference value KAWM is obtained in Step S18 that will be described later.

When the count has reached 10 times, the program proceeds to Step S16, and if the linear regression coefficient KA1 is largely different from the average reference vale KAWM, it is repeatedly determined that the road is not a high $\mu$ road so that rejection is performed (Step S16). As for a threshold for the rejection, all values that are not less than, for instance, 1.5 times of the correction regression coefficient KAW are rejected. Note that this value of 1.5 has been set through past experiments.

A value corresponding to the average fluctuation amount SVALM multiplied by $\alpha$, for instance, by 0.1, is subtracted from the linear regression coefficient KA1 in Step S17. Note that the value for $\alpha$ is preliminarily set for each vehicle upon experiments.

$$KAW=KA1-\alpha \times SVALM \quad (18)$$

(12) Upon accumulating 10 of the correction regression coefficients KAW, an average value thereof is defined to be the average reference value KAWM. Hereinafter, each time a new correction regression coefficient KAW is obtained, the oldest correction regression coefficient KAW is abandoned for obtaining the average reference value KAWM (Steps S18, S19).

(13) The threshold LA is then calculated from the average reference value KAWM from the following equation (19) (Step S20).

$$LA=6 \times KAWM^2+0.4 \times KAWM+0.04 \quad (19)$$

The equation (19) has been calculated from experiments. The threshold LA obtained from the equation (19) is averaged by past thresholds LA for updating.

For instance, if the first obtained threshold is 0.122 and a new threshold 0.118 is obtained, the threshold will be given by (0.122+0.118)/2=0.120. If an additional threshold 0.126 is obtained, the threshold will be (0.122+0.118+0.126)/3= 0.122.

Figure 3:
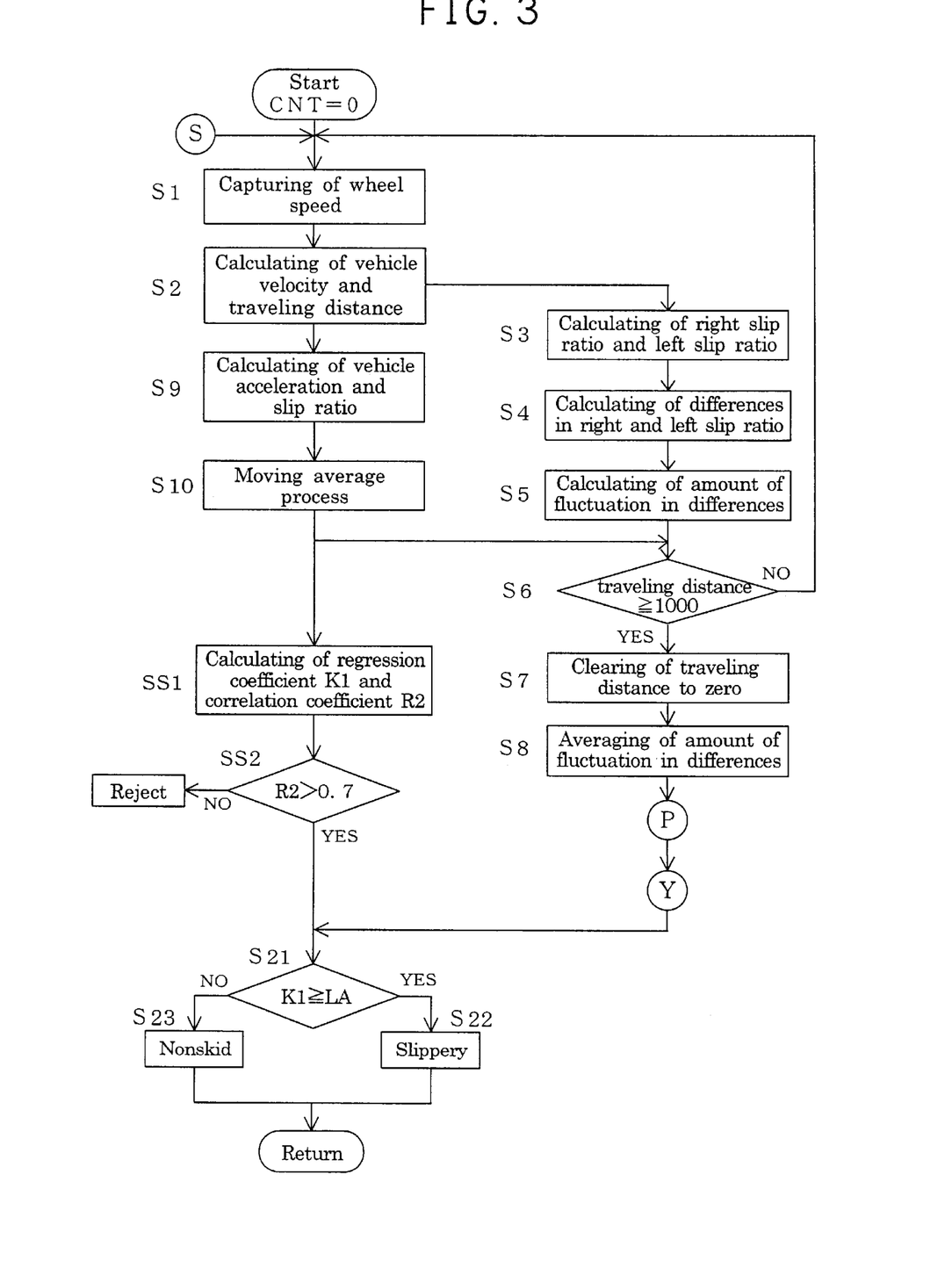
FIG. 3 illustrates one example of a flowchart of the present invention.

If the reference value K1 obtained during running as a result of judging a road surface condition as obtained in above Steps SS1 and SS2 in FIG. 3 is larger than the set threshold, it is determined that the condition is slippery, and if smaller, that no tendency of slip exists (Steps S21 to S23). Note that alarm is issued to a driver when it is determined that the condition is slippery.

EXAMPLES

While the present invention will now be explained on the basis of examples thereof, the present invention is not to be limited to such examples only.

A rear wheel drive vehicle was provided which was mounted with an apparatus for judging road surface conditions programmed to correct and reject thresholds for judging road surface conditions by utilizing an amount of fluctuation in differences in right and left slip ratios. The road surfaces on which running was performed were a dry asphalt road and thereafter a trod, frozen snow road. Time varying changes in the obtained thresholds LA (examples) are illustrated in FIG. 5.

Figure 5:
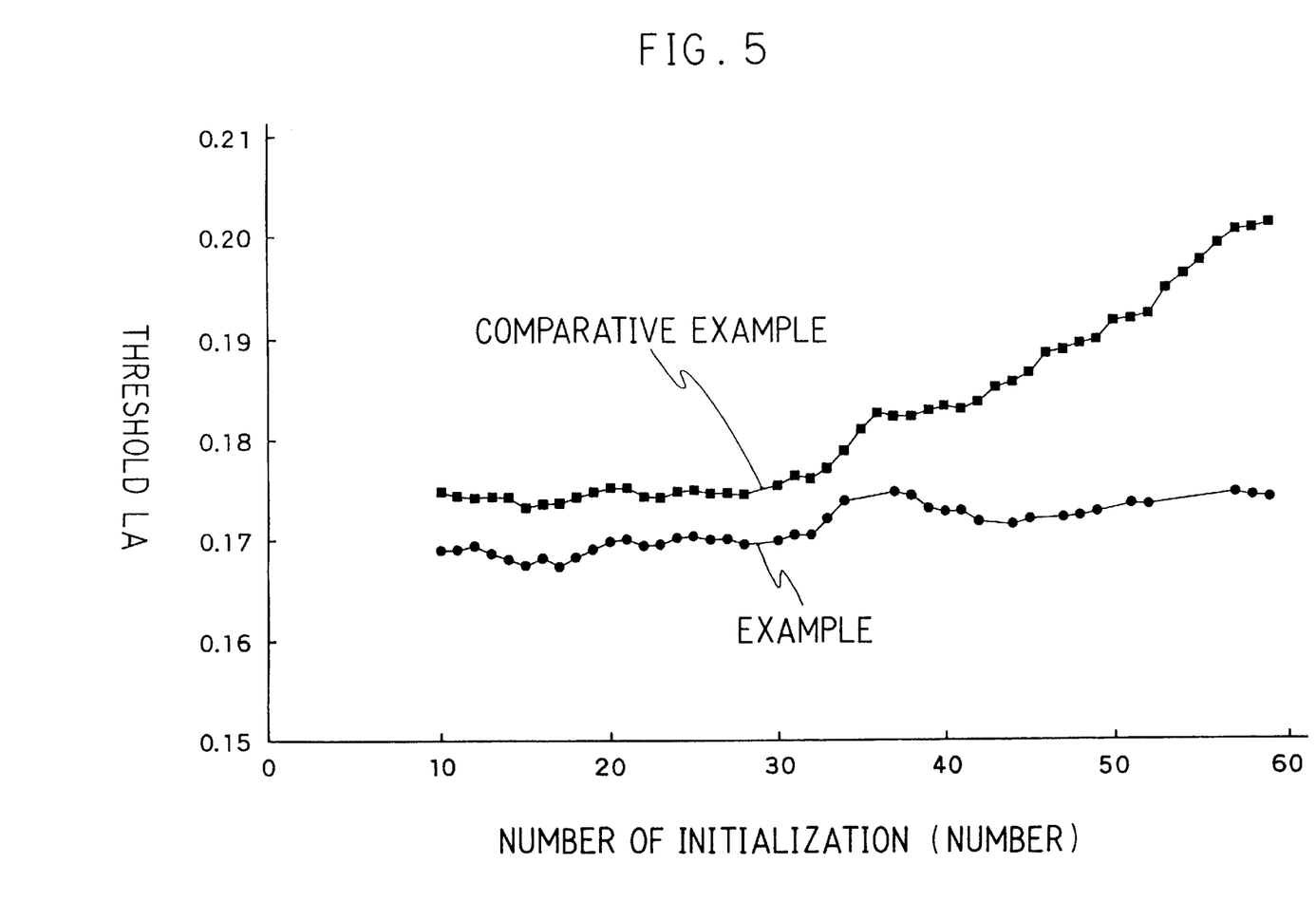
FIG. 5 is a diagram illustrating a relationship between threshold and number of initialization.

On the other hand, results of thresholds LA obtained without performing correction or rejection of linear regression coefficients KA1 when the amount of fluctuation in right and left slip ratios or the correction coefficients RA are not less than 0.9, expect for Steps S3 to S5, S8 and S13 to S19 as illustrated in FIGS. 3 and 4, are illustrated in FIG. 5 as a comparative example.

It can be understood from FIG. 5 that the threshold hardly increases but maintains a substantially constant value even though the vehicle is running on a trod, frozen snow road. It is accordingly possible to judge road surface conditions correctly.

In contrast thereto, since thresholds of the comparative example are not corrected on the basis of amounts of fluctuations in differences in right and left slip ratios in the present example, it can be seen that the threshold gradually increases when it comes to running on a trod, frozen snow road. It will thus be impossible to correctly determine road surface conditions so that it might lead to problem that no alarm is smoothly generated even if the vehicle is running on a low $\mu$ road.

As explained so far, according to the present invention, the threshold will not become larger when the vehicle is running on a low $\mu$ road such as a trod, frozen snow road so that it is possible to accurately judge road surface conditions in a stable manner.

What is claimed is:

1. A method for judging road surface conditions, comprising the steps of: periodically detecting rotational information of tires of four wheels of a vehicle; storing the rotational information of the respective tires; calculating a vehicle velocity from the rotational information; calculating an acceleration/deceleration of the vehicle; calculating a slip ratio of left-sided front and rear wheels and right-sided front and rear wheels and a slip ratio of front and rear wheels, respectively; calculating an amount of fluctuation in differences in slip ratios between the right and left wheels; obtaining a linear regression coefficient and a correlation coefficient between the slip ratio of the front and rear wheels and the acceleration/deceleration of the vehicle; and setting a threshold for judging road surface conditions on the basis of the linear regression coefficient if the amount of fluctuation is a specified value.

2. The method of claim 1, wherein a traveling distance of the vehicle is calculated to perform averaging of the amount of fluctuation per each specified traveling distance of the vehicle.

3. The method of claim 2, wherein the linear regression coefficient is rejected if the averaged fluctuation amount is more than the specified value for refraining from updating the threshold.

4. The method of claim 3, wherein the linear regression coefficient is corrected if an averaged fluctuation amount is a specified value to calculate the threshold from the corrected linear regression coefficient.

5. An apparatus for judging road surface conditions, comprising: a rotational information detecting means for periodically detecting rotational information of tires of four wheels of a vehicle; a rotational information storing means for storing the rotational information of the respective tires; a vehicle velocity calculating means for calculating a vehicle velocity from the rotational information; an acceleration/deceleration calculating means for calculating an acceleration/deceleration of the vehicle; a slip ratio calculating means for calculating a slip ratio of left-sided front and rear wheels and right-sided front and rear wheels and a slip ratio of front and rear wheels, respectively; a fluctuation amount calculating means for calculating an amount of fluctuation in differences between the right and left slip ratios; a coefficient calculating means for obtaining a linear regression coefficient and a correlation coefficient between the slip ratio of the front and rear wheels and the acceleration/deceleration of the vehicle; and a threshold setting means for setting a threshold for judging road surface conditions on the basis of the linear regression coefficient if the amount of fluctuation is a specified value.

6. The apparatus of claim 5 wherein the apparatus includes a traveling distance calculating means for calculating a traveling distance of the vehicle; and a fluctuation amount averaging and processing means for performing averaging of the amount of fluctuation per each specified traveling distance of the vehicle.

7. The apparatus of claim 6, wherein the apparatus includes a reject means for rejecting the linear regression coefficient if the averaged fluctuation amount is not less than a specified value and for refraining from updating the threshold.

8. The apparatus of claim 7, wherein the apparatus includes a coefficient correcting means for correcting the linear regression coefficient if an averaged fluctuation amount is a specified value.

9. A program for setting a threshold for judging road surface conditions, wherein a computer is made to function as a rotational information storing means for storing rotational information of respective tires; a vehicle velocity calculating means for calculating a vehicle velocity from the rotational information; an acceleration/deceleration calculating means for calculating an acceleration/deceleration of the vehicle; a slip ratio calculating means for calculating a slip ratio of left-sided front and rear wheels and right-sided front and rear wheels and a slip ratio of front and rear wheels, respectively; a fluctuation amount calculating means for calculating an amount of fluctuation in differences between right and left slip rates; a coefficient calculating means for obtaining a linear regression coefficient and a correlation coefficient between the slip ratio of the front and rear wheels and the acceleration/deceleration of the vehicle; and a threshold setting means for setting a threshold for judging road surface conditions on the basis of the linear regression coefficient if the amount of fluctuation is a specified value.

10. The program of claim 9, wherein the computer is made to function as a traveling distance calculating means for calculating a traveling distance of the vehicle; a fluctuation amount averaging and processing means for performing averaging of the amount of fluctuation per each specified traveling distance of the vehicle; a coefficient correcting means for correcting the linear regression coefficient if an averaged fluctuation amount is a specified value; and a reject means for rejecting the linear regression coefficient if the averaged fluctuation amount is not less than a specified value and for refraining from updating the threshold.

* * * * *